United States Patent [19]

Sogabe et al.

[11] Patent Number: 5,592,824

[45] Date of Patent: Jan. 14, 1997

[54] DRIVING CONTROL DEVICE FOR AIR CONDITIONER

[75] Inventors: Masaharu Sogabe; Hisashi Sumida, both of Osaka, Japan

[73] Assignee: Daikin Industries, Ltd., Osaka, Japan

[21] Appl. No.: 360,846

[22] PCT Filed: Apr. 27, 1994

[86] PCT No.: PCT/JP94/00734

§ 371 Date: Feb. 27, 1995

§ 102(e) Date: Feb. 27, 1995

[87] PCT Pub. No.: WO94/25803

PCT Pub. Date: Nov. 10, 1994

[30] Foreign Application Priority Data

Apr. 28, 1993 [JP] Japan ..................... 5-102136

[51] Int. Cl.⁶ ..................... F24F 11/02
[52] U.S. Cl. ............... 62/127; 62/175; 236/51
[58] Field of Search ............... 62/125, 126, 127, 62/129, 175, 510, 115; 165/12, 22; 236/51

[56] References Cited

U.S. PATENT DOCUMENTS

| | | | |
|---|---|---|---|
| 4,811,897 | 3/1989 | Kobayashi et al. | 236/51 X |
| 5,279,458 | 1/1994 | DeWolf et al. | 165/22 X |
| 5,383,336 | 1/1995 | Nishida et al. | 62/175 X |
| 5,499,510 | 3/1996 | Yoshida et al. | 62/175 |

FOREIGN PATENT DOCUMENTS

| | | |
|---|---|---|
| 0321253 | 6/1989 | European Pat. Off. . |
| 2-4154 | 1/1990 | Japan . |
| 2-85634 | 3/1990 | Japan . |
| 2-146448 | 5/1990 | Japan . |
| 2-272252 | 11/1990 | Japan . |
| 4194539 | 7/1992 | Japan . |
| 4288440 | 10/1992 | Japan . |

*Primary Examiner*—Harry B. Tanner
*Attorney, Agent, or Firm*—Sixbey, Friedman, Leedom & Ferguson, P.C.; Gerald J. Ferguson, Jr.

[57] ABSTRACT

An ON-OFF controller (5B) connected to a plurality of indoor units (3, 3, ...) specifies a range of address settings of each of the indoor units (3, 3, ...) managed by the ON-OFF controller (5B), and outputs a signal showing the range of address settings to the respective indoor units (3, 3, ...) based on the range of address settings. When receiving the signal showing the range of address settings from the ON-OFF controller (5B), each of the indoor units (3, 3, ...) outputs to a remote control (4) a signal allowing an address setting, and stores an address for itself inputted from the remote control (4). The remote control (4) indicates the range of address settings when receiving the signal allowing an address setting from the indoor unit (3, 3, ...), and has an input button (4c) by which an address of the indoor unit (3, 3, ...) is inputted.

12 Claims, 12 Drawing Sheets

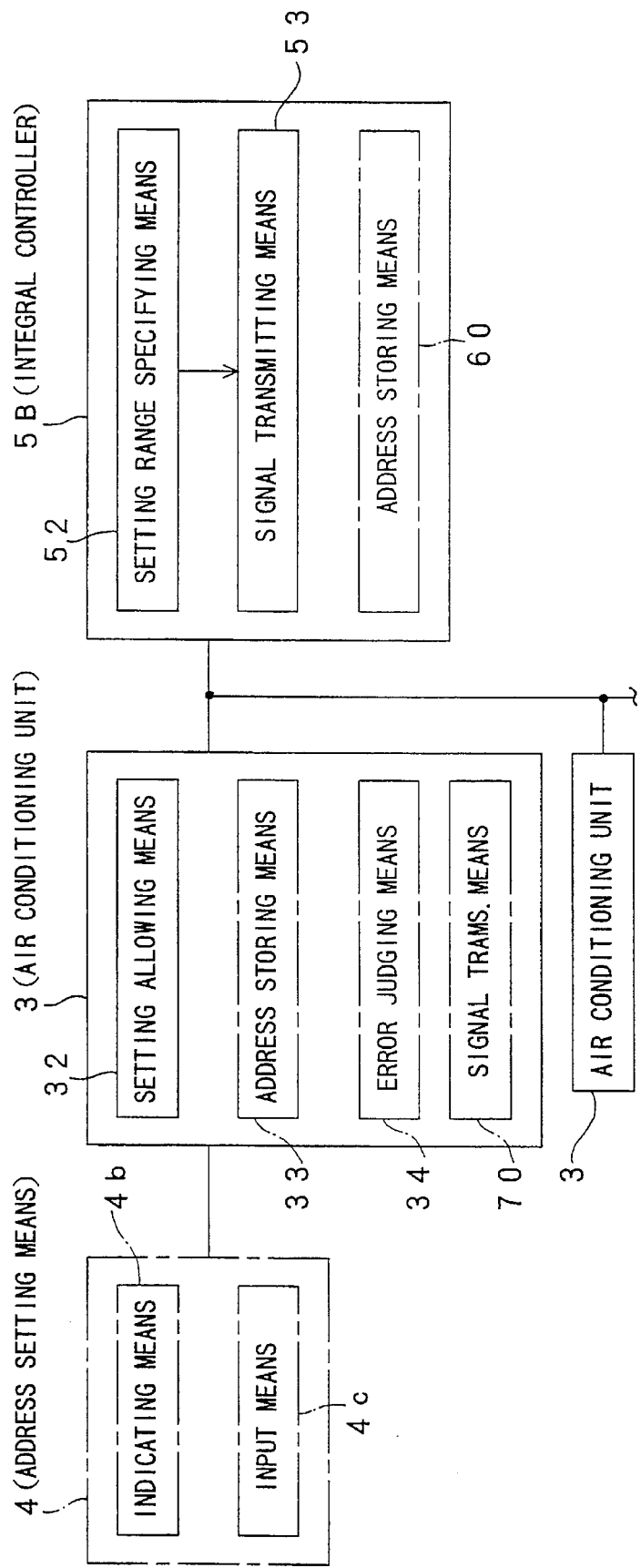
F I G. 1 ns5,592,824

DRIVING CONTROL DEVICE FOR AIR CONDITIONER

TECHNICAL FIELD

This invention relates to a driving control device for an air conditioner, in particular, relates to measures for address setting.

BACKGROUND ART

In conventional air conditioners, as shown in the Japanese Patent Laying Open Gazette No. 2-146448, a plurality of indoor units are connected to a remote control and connected to an integral controllar, in which driving signals and temperature setting signals are transmitted and received between the indoor units and the remote control and driving signals are transmitted and received between each of the indoor units and the integral controller, thereby controlling air conditioning.

Further, respective indoor addresses are previously set to the respective indoor units so that control signals are transmitted and received between each of the indoor units and the integral controller based on the respective indoor addresses.

Problems to be solved

In the above-mentioned air conditioner, the indoor address of the indoor unit is set by a DIP switch, a remote control or the like. However, when an improper setting is made between the integral controller and the indoor address managed by the integral controller, a communication error is generated.

In detail, for example, there has been recently increased the number of indoor units to be provided in an air conditioner and at the same time it is intended that a plurality of integral controllers are provided to divide the indoor units into a plurality of blocks and that the indoor units are integrally managed in each block by each integral controller. In this case, since the number of indoor units to be managed by each integral controller is limited, a range of address settings is defined in each integral controller. On the other hand, the indoor address is set by the remote control or the like. When an indoor address other than the range of address settings is set to an indoor unit, communication cannot be established between the integral controller in question and the indoor unit in question thereby generating a communication error.

Further, once an indoor address is set to an indoor unit, the integral controller automatically stores the indoor address at the power-on and establishes communication with the indoor unit based on the stored indoor address. However, when the indoor address is changed by the remote control or the like, the indoor address for communication is lost, thereby generating a communication error. As a result, in order to recover from the communication error, the power of the integral controller must be reset.

In view of the foregoing problems, this invention has been made. An object of this invention is to prevent an improper setting of address and have the ability of responding to an address change thereby preventing a communication error.

DISCLOSURE OF INVENTION

To attain the above object, a measure taken in this invention is so designed that an integral controller outputs a signal showing a range of address settings. Further, another measure taken in this invention is so designed that the integral controller cancels a set address. Furthermore, yet another measure taken in this invention is so designed that the range of address settings in the integral controller is changeable.

Constitution

In detail, as shown in FIG. 1, a measure taken in claim 1 of this invention premises a driving control device for an air conditioner in which an integral controller (5B) is connected to a plurality of air conditioning units (3, 3, . . . ) so that control signals are transmitted and received between each of the air conditioning units (3, 3, . . . ) and the integral controller (5B).

Further, the integral controller (5B) is provided with: setting range specifying means (52) for specifying a range of address settings within which an address can be set to each of the air conditioning units (3, 3, . . . ) managed by the integral controller (5B); and signal transmitting means (53) for outputting a signal showing the range of address settings to each of the air conditioning units (3, 3, . . . ) based on the range of address settings which has been specified by the setting range specifying means (52).

Furthermore, each of the air conditioning units (3, 3, . . . ) is provided with setting allowing means (32) for outputting a signal allowing an address setting when receiving the signal showing the range of address settings which has been outputted from the signal transmitting means (53) of the integral controller (5B).

As a measure taken in claim 2 of this invention, in a driving control device for an air conditioner according to claim 1, there is provided address setting means (4) having: indicating means (4b) for indicating the range of address settings when receiving the signal allowing an address setting which has been outputted from the setting allowing means (32) of the air conditioning unit (3, 3, . . . ); and input means (4c) from which an address of the air conditioning unit (3, 3, . . . ) is inputted based on the indication of the indicating means (4b).

Further, each of the air conditioning units (3, 3, . . . ) is provided with address storing means (38) for storing a set address inputted from the input means (4c) of the address setting means (4).

As a measure taken in claim 3 of this invention, in a driving control unit for an air conditioner according to claim 2, each of the air conditioning units (3, 3, . . . ) is provided with signal transmitting means (70) for outputting an address signal of the set address inputted from the input means (4c) of the address setting means (4).

Further, the integral controller (5B) is provided with address storing means (60) for storing each address in each of the air conditioning units (3, 3, . . . ) when receiving the address signal outputted from the signal transmitting means (70) of each of the air conditioning units (3, 3, . . . )

As a measure taken in claim 4 of this invention, in a driving control device for an air conditioner according to claim 1, each of the air conditioning units (3, 3, . . . ) is provided with error judging means (34) for judging whether a communication error is generated between the air conditioning unit (3) and the integral controller (5B) or not based on the signal showing the range of address settings when receiving the signal outputted from the signal transmitting means (53) of the integral controller (5B).

As shown in FIG.2, a measure taken in claim 5 of this invention premises a driving control device for an air conditioner in which an integral controller (5B) is connected to a plurality of air conditioning units (3, 3, . . . ) and each of the air conditioning units (3, 3, . . . ) is connected to address setting means (4) for setting an address of the air conditioning unit (3) so that control signals are transmitted and received between each of the air conditioning units (3, 3, . . . ) and the integral controller (5B) based on the address set by the address setting means (4).

Further, each of the air conditioning units (3, 3, . . . ) is provided with data output means (35) for, when the set address is changed by the address setting means (4), outputting changed data together with the changed address.

Furthermore, the integral controller (5B) is provided with address canceling means (54) for, when receiving the changed data outputted from the data output means (35) of the air conditioning unit (3, 3, . . . ), canceling an address registered therein with respect to the air conditioning unit (3, 3, . . . ) having the changed address and storing the changed address.

As shown in FIG. 3, a measure taken in claim 6 of this invention premises a driving control device for an air conditioner in which an integral controller (5B) is connected to a plurality of air conditioning units (3, 3, . . . ) so that control signals are transmitted and received between each of the air conditioning units (3, 3, . . . ) and the integral controller (5B).

Further, the integral controller (5B) is provided with: setting range specifying means (52) for specifying a range of address settings within which an address can be set to each of the air conditioning units (3, 3, . . . ) managed by the integral controller (5B); and signal transmitting means (53) for outputting a signal showing the range of address settings to each of the air conditioning units (3, 3, . . . ) based on the range of address settings which has been specified by the setting range specifying means (52).

Furthermore, each of the air conditioning units (3, 3, . . . ) is provided with setting allowing means (32) for outputting a signal allowing an address setting when receiving the signal showing the range of address settings which has been outputted from the signal transmitting means (53) of the integral controller (5B).

Further, there is provided address setting means (4) having: indicating means (4b) for indicating the range of address settings when receiving the signal allowing an address setting which has been outputted from the setting allowing means (32) of the air conditioning unit (3, 3, . . . ); and input means (4c) from which an address of the air conditioning unit (3, 3, . . . ) is inputted based on the indication of the indicating means (4b).

Furthermore, each of the air conditioning units (3, 3, . . . ) is provided with signal transmitting means (70) for outputting an address signal of the set address inputted from the input means (4c) of the address setting means (4).

In addition, the integral controller (5B) is provided with address deleting means (80) for deleting the set address from the range of address settings in the setting range specifying means (52) when receiving the address signal outputted from the signal transmitting means (70) of each of the air conditioning units (3, 3, . . . ).

As a measure taken in claim 7 of this invention, in a driving control device for an air conditioner according to claim 6, each of the air conditioning units (3, 3, . . . ) is provided with address storing means (33) for storing the set address inputted from the input means (4c) of the address setting means (4).

Further, the integral controller (5B) is provided with address storing means (60) for storing each address in each of the air conditioning units (3, 3, . . . ) when receiving the address signal outputted from the signal transmitting means (70) of each of the air conditioning units (3, 3, . . . )

As a measure taken in claim 8 of this invention, in a driving control device for an air conditioner according to claim 6, each of the air conditioning units (3, 3, . . . ) is provided with address changing means (82) for, when the set address is canceled by the address setting means (4), outputting canceling data together with the canceled address.

Further, the integral controller (5B) is provided with address adding means (81) for adding the canceled address to the range of address settings when receiving the canceling data outputted from the address changing means (82) of the air conditioning unit (3, 3, . . . ).

As a measure taken in claim 9 of this invention, in a driving control device for an air conditioner according to claim 8, the address setting means (4) is provided with an address canceling button (4e) with which a canceling signal for canceling an address is inputted.

As a measure taken in claim 10 of this invention, in a driving control device for an air conditioner according to any of claims 2–9, the address setting means (4) is composed of a remote control.

As a measure taken in claim 11 of this invention, in a driving control device for an air conditioner according to any of claims 2–4 and 6–9, the input means (4c) of the address setting means (4) is composed of an input button provided in a remote control.

As a measure taken in claim 12 of this invention, in a driving control device for an air conditioner according to any of claims 2–4 and 6–9, the indicating means (4b) of the address setting means (4) is composed so as to indicate the range of address settings by turning on an address setting button (4d) provided in the address setting means (4).

Operations

With the above structure, in the driving control device for the air conditioner of claim 1, the setting range specifying means (52) of the integral controller (5B) specifies a range of address settings according to the number of air conditioning units (3, 3, . . . ) manageable by the integral controller (5B), for example, it specifies a range of address settings from address #0 to address #15. Then, the signal transmitting means (53) of the integral controller (5B) transmits a signal showing the range of address settings to each of the air conditioning units (3, 3, . . . ), based on the range of address settings which has been specified by the setting range specifying means (52). The setting allowing means (32) of each of the air conditioning units (3, 3, . . . ) outputs a signal allowing an address setting when receiving the signal showing the range of address settings from the integral controller (5B).

In the driving control device for the air conditioner of claim 2, when the address setting means (4) receives the signal allowing an address setting, the indicating means (4b) indicates the range of address settings and an address included within the indicated range is inputted from the input means (4c). Specifically, in the driving control devices of claims 10–12, when the remote control (4) receives the signal allowing an address setting, the indicating means (4b) indicates the range of address settings by turning on the address setting button (4d) of the remote control (4). At the sight of the indicated range of address settings, an operator or the like inputs an address from the input button (4c).

The air conditioning unit (3, 3, . . . ) receives the address inputted from the address setting means (4) and then the address storing means (33) stores the address.

In the driving control device of claim 3, the signal transmitting means (70) of the air conditioning unit (3, 3, . . .) outputs an address signal of the set address inputted from the input means (4c) of the address setting means (4). Then, the address storing means (60) of the integral controller (5B) stores each address in each of the air conditioning units (3, 3, . . . ) when receiving the address signal from each of the air conditioning units (3, 3, . . . ). Thereafter, based on each of the set addresses, communication is established between each of the air conditioning units (3, 3, . . . ) and the integral controller (5B).

In the driving control device of claim 4, when the error judging means (34) of each of the air conditioning units (3, 3, . . . ) receives the signal showing the range of address settings which has been transmitted from the signal transmitting means (53) of the integral controller (5B), the error judging means (34) judges whether a communication error is generated between the integral controller (5B) and the air conditioning unit (3, 3, . . . ). In other words, the signal showing a range of address settings doubles as a signal for judging a communication error.

In the driving control device of claim 5, when an address is first set to the air conditioning unit (3, 3, . . . ) by the address setting means (4) and thereafter a new address is set to the same by the address setting means (4) in question, the data output means (35) outputs, to the integral controller (5B), changed data indicating the change of address together with the changed address.

On the other hand, when the address canceling means (54) of the integral controller (5B) receives the changed data on address from the air conditioning unit (3, 3, . . . ), it cancels the existing address of the air conditioning unit (3) according to the changed data, stores the changed new address and registers it.

As a result, thereafter, communication is established based on the new address between the integral controller (5B) and the air conditioning unit (3, 3, . . . ).

In the driving control device of claim 6, when an address is set to the air conditioning unit (3, 3, . . . ) by the input means (4c) of the address setting means (4), the signal transmitting means (33) of the air conditioning unit (3, 3, . . . ) transmits an address signal of the set address to the integral controller (5B). When receiving the address signal, the address deleting means (80) of the integral controller (5B) deletes the set address from the range of address settings in the setting range specifying means (52).

For example, when address #0 is set to one air conditioning unit (3), the address #0 is deleted from the range of address settings in the setting range specifying means (52) of the integral controller (5B), the data on the range of address settings from which the address #0 is deleted is transmitted to the address setting means (4), and then the range of address settings is indicated on the indicating means (4b).

In the driving control device of claim 7, the address storing means (33) of the air conditioning unit (3, 3, . . . ) stores the address inputted from the address setting means (4), and the address storing means (60) of the integral controller (5B) stores each address in each of the air conditioning units (3, 3, . . . ) when receiving the address signal from each of the air conditioning units (3, 3, . . . ).

In the driving control device of claim 8, when an indoor address which has been set once is canceled by the address setting means (4), for example, when a canceling signal is inputted from the address canceling button (4e) in the driving control device of claim 9, canceling data on address is transmitted from the address changing means (82) of the air conditioning unit (3) to the integral controller (5B). For example, the canceled address is transmitted to the integral controller (5B).

Next, the address adding means (81) of the integral controller (5B) managing the air conditioning unit (3) an address of which has been canceled adds the canceled address to the range of address settings in the setting range specifying means (52).

For example, when address #0 of the air conditioning unit (3) is canceled, the address #0 is added to the range of address settings in the setting range specifying means (52) of the integral controller (5B).

Effects

According to the driving control device of claim 1, since data on a range of address settings is transmitted from the integral controller (5B) to the air conditioning units (3, 3, . . . ), improper address settings with respect to the air conditioning units (3, 3, . . . ) can be prevented. This securely prevents a communication error due to the improper address setting, thereby enhancing communication accuracy.

According to the driving control devices of claims 2 and 12, since a range of address settings is indicated on the address setting means (4) and an address of the air conditioning unit (3, 3, . . . ) is set based on the indication of the range of address settings, addresses of the air conditioning units (3, 3, . . . ) managed by the integral controller (5B) can be securely set. This facilitates address settings and prevents improper address settings. In particular, according to the driving control device of claim 3, since the integral controller (5B) automatically stores addresses, workability at the installation of the air conditioning units (3, 3, . . . ) or other times can be enhanced.

According to the driving control device of claim 4, since a signal showing a range of address settings which has been transmitted from the integral controller (5B) is used as a signal for detecting a communication error, the communication error can be also detected without increase of communication information. This simplifies communication information while enhancing communication accuracy.

According to the driving control device of claim 5, when an address of the air conditioning unit (3, 3, . . . ) is changed, the integral controller (5B) changes the existing address to a new address and registers the new address. This securely prevents a communication error after the change of address, thereby securely enhancing communication accuracy.

In particular, since re-registration of address by a power reset of the integral controller (5B) or other manners is not necessary, this facilitates address settings thereby increasing serviceability.

Further, when an indoor address is changed, it is essential only that a new address is inputted, and an operation of deleting the pre-changed indoor address is dispensed with. This facilitates an address changing operation.

According to the driving control devices of claims 6 and 7, when an address of the air conditioning unit (3, 3, . . . ) is set, the set address is deleted from a range of address settings in the setting range specifying means (52) of the integral controller (5B). This obviates duplicate address settings. As a result, a communication error can be securely prevented thereby enhancing communication accuracy.

According to the driving control devices of claims 8 and 9, when an address of the air conditioning unit (3, 3, . . . ) is canceled, the canceled address is added to a range of address settings in the setting range specifying means (52) of the integral controller (5B). This enables accurate recognition of addresses which can be set, thereby facilitating address settings.

According to the driving control devices of claims 10 and 11, since the address setting means (4) is composed of a remote control, exclusive address setting means is not necessary. This simplifies the configuration of the driving control device.

BRIEF DESCRIPTION OF DRAWINGS

FIG. 1 is a block diagram showing the structure of a driving control device for an air conditioner according to claims 1 to 4 of this invention.

BEST MODE FOR CARRYING OUT THE INVENTION

Description is made below about embodiments of this invention with reference to the drawings.

First embodiment

Figure 2:
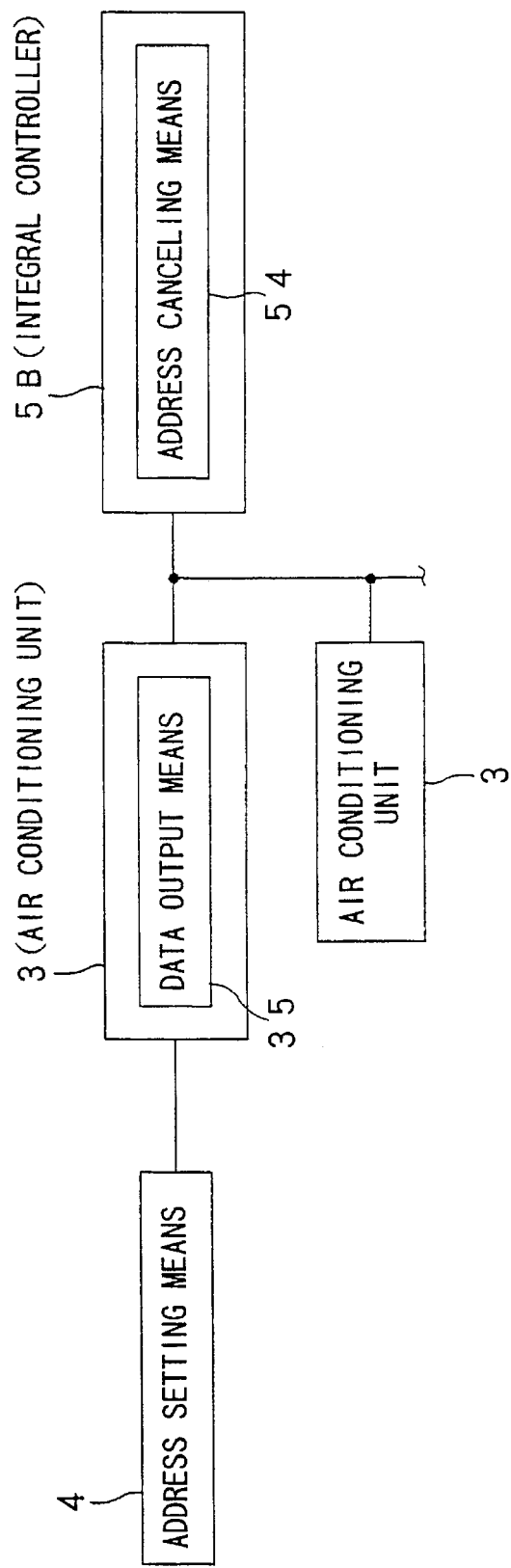
FIG. 2 is a block diagram showing the structure of another driving control device for an air conditioner according to claim 5 of this invention.
Figure 3:
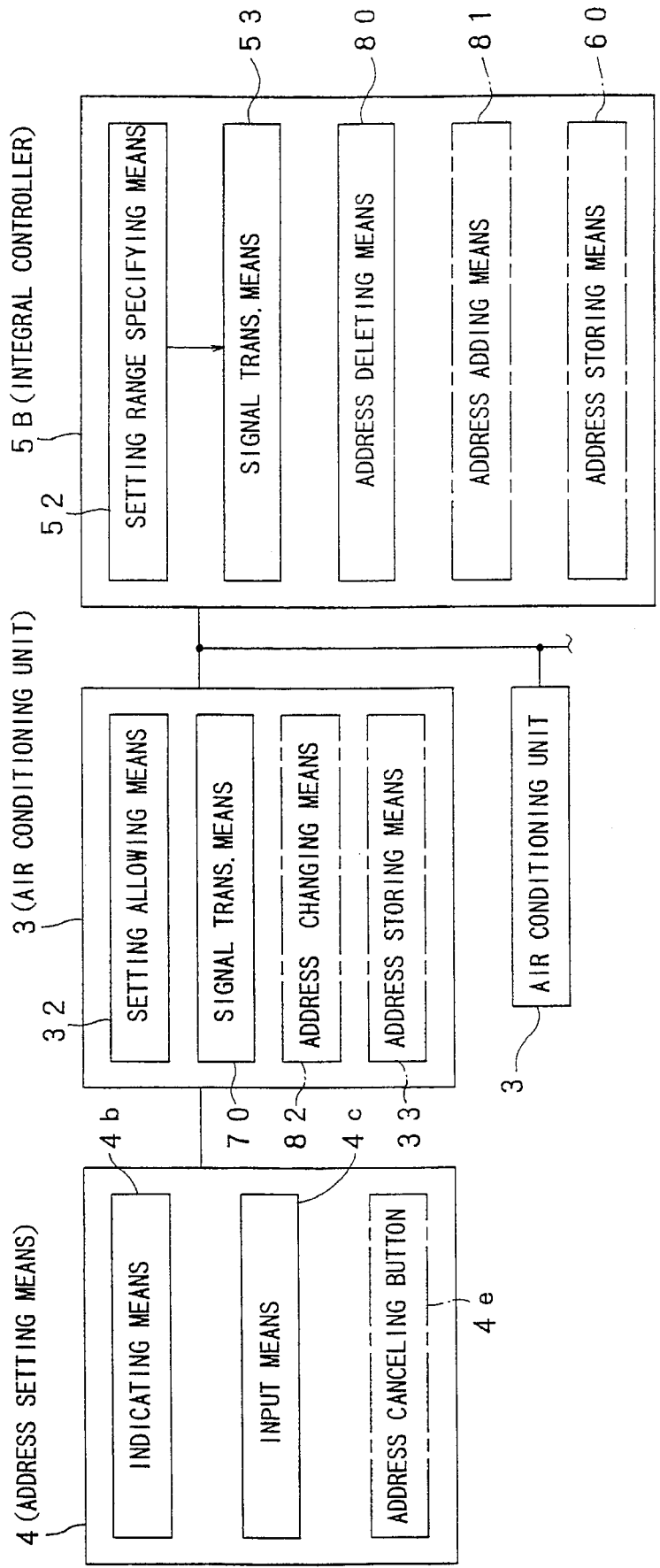
FIG. 3 is a block diagram showing the structure of yet another driving control device for an air conditioner according to claims 6 to 9 of this invention.
Figure 4:
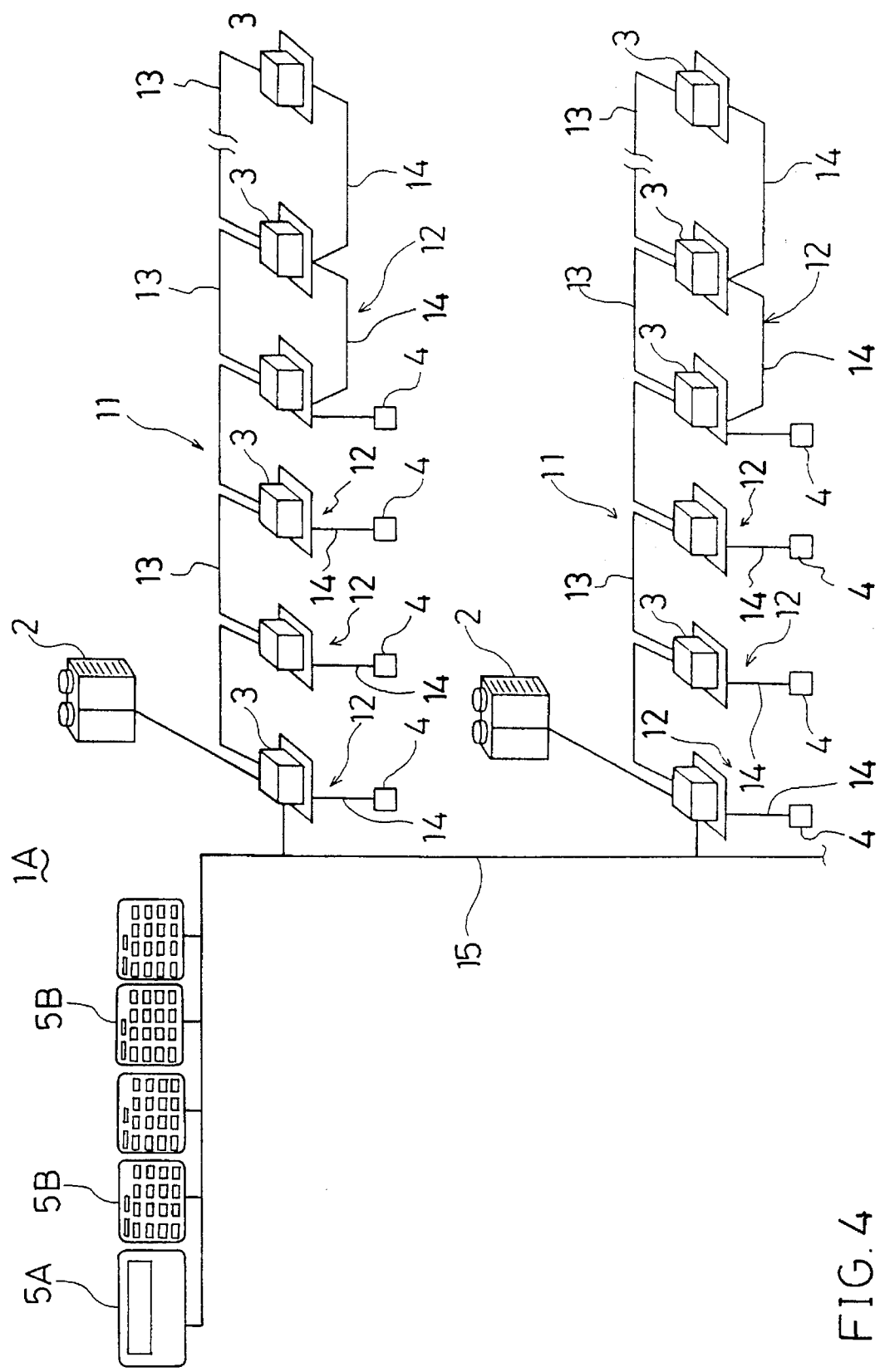
FIG. 4 is a diagram showing a whole system of an air conditioner.

FIG. 4 is a diagram showing a whole system construction of an air conditioner (1A). The air conditioner (1A) includes a plurality of refrigerant systems (11) each so composed that a single outdoor unit (2) is connected via refrigerant piping to a plurality of indoor units (3, 3, ...) as air conditioning units. In each of the refrigerant systems (11), the outdoor unit (2) is connected to the indoor units (3, 3, ...) via signal lines (13) so that control signals such as a driving signal are transmitted and received between the outdoor unit (2) and each of the indoor units (3, 3, ...).

Further, each of the indoor units (3, 3, ...) is connected to a remote control (4) via a signal line (14). Each remote control (4) is connected to each of the indoor units (3, 3, ...) or one remote control (4) is connected to a plurality of indoor units (3, 3, ...), so that a remote control group (12) composed of one or more indoor units (3, 3, ...) to be controlled by one remote control (4) is formed in every one remote control (4).

Furthermore, all the indoor control units (3, 3, ...) are connected via a signal line (15) to an integral managing controller (5A) and an ON-OFF controller (5B) each of which is an integral controller. The integral managing controller (5A) is composed so as to have the ability of controlling and managing drive and deactivation of the indoor units (3, 3, ...), temperature settings and so on. The ON-OFF controller (5B) is composed so as to have only the ability of controlling and managing drive and deactivation of the indoor units (3, 3, ...).

Figure 5:
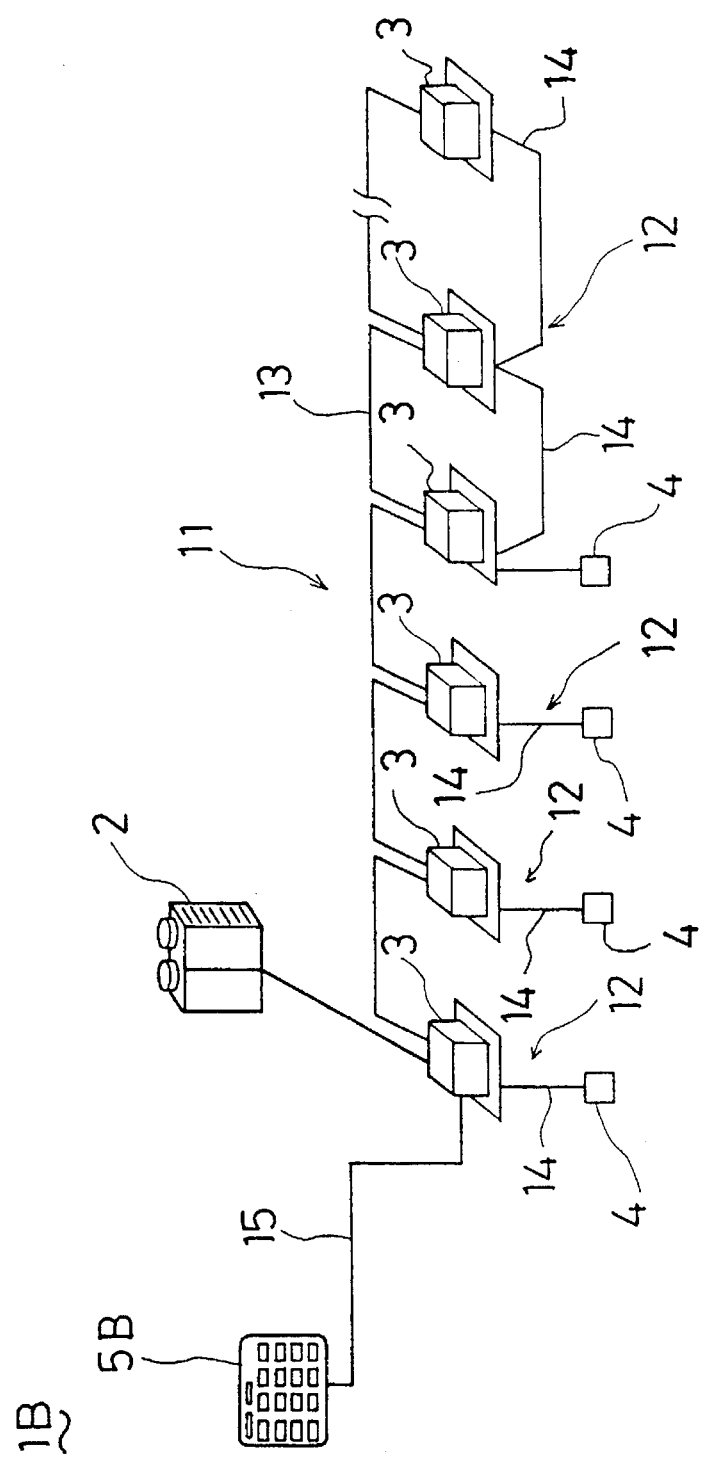
FIG. 5 is a diagram showing a whole system of another air conditioner.

FIG.5 is a diagram showing a whole system construction of another air conditioner (1B). In the air conditioner (1B), unlike the air conditioner (1A) of FIG. 4, only a single refrigerant system (11) is provided, is connected to a single ON-OFF controller (5B) as an integral controller and has a system construction different from the air conditioner (1A) of FIG. 4 based on the differences of the number of indoor units (3, 3, ...) and a managing manner.

Figure 6:
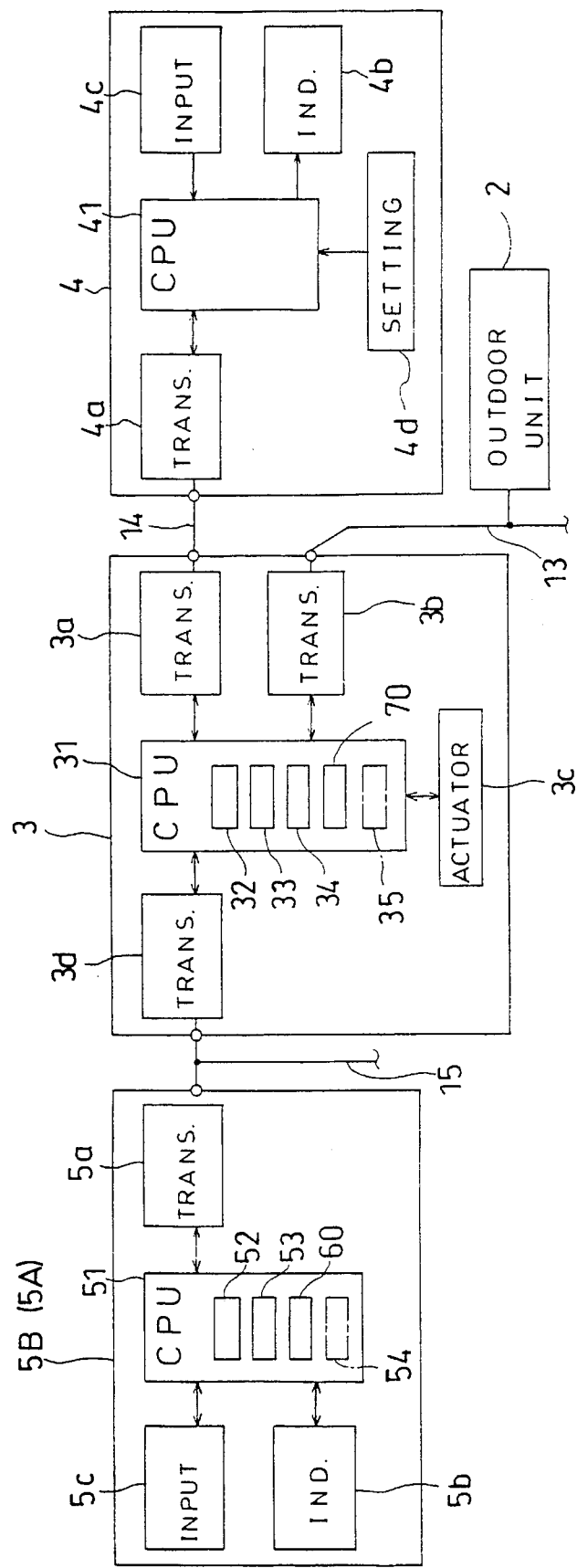
FIG. 6 is a block diagram showing a control system of a main part of the air conditioner.

FIG. 6 shows a control block diagram for both the air conditioners (1A, 1B). The indoor unit (3, 3, ...) has a CPU (31). The CPU (31) is connected via transmission parts (3a, 3b, 3c) to the remote control (4), the ON-OFF controller (5B) and the outdoor unit (2), and is connected to various kinds of actuators (3d) such as an indoor fan to control the volume of air of the fan and so on.

The remote control (4) has a CPU (41). The CPU (41) is connected to the indoor unit (3, 3, ...) via a transmission part (4a) and is connected to an indicating part (4b), an input button (4c) and an address setting button (4d). The indicating part (4b) is composed so as to indicate by lamps or LCDs a driving state, a room temperature, a set temperature and so on of one or more indoor units (3, 3, ...) managed by one remote control (4). The input button (4c) is so composed that signals such as a driving signal and a temperature setting signal are inputted therefrom.

The address setting button (4d) is an operating button for setting an indoor address of the indoor unit (3, 3, ...). By turning the address setting button (4d) on, the indoor address of the indoor unit (3, 3, ...) can be set.

The ON-OFF controller (5B) has a CPU (51). The CPU (51) is connected to the plural indoor units (3, 3, ...) via a transmission part (5a) and is connected to an indicating part (5b) and an input button (5c). The indicating part (5b) is composed so as to indicate by lamps driving states of the indoor units (3, 3, ...) managed by the ON-OFF controller (5B). The input button (5c) is so composed that a driving signal and a deactivating signal are inputted therefrom.

In FIG. 6, only a single ON-OFF controller (5B) as an integral controller is shown. On the other hand, in the air conditioner (1A) shown in FIG. 4, the integral managing controller (5A) and other ON-OFF controllers (5B) are connected to the indoor units (3, 3, ...). The integral managing controller (5A) of FIG. 4 has the same configuration as the ON-OFF controller (5B). In addition, the indicating part (5b) is composed so as to indicate by lamps or LCDs a driving state, a room temperature, a set temperature and so on of one or more indoor units (3, 3, ...) managed by the integral managing controller (5A), and the input button (5c) is so composed that signals such as a driving signal and a temperature setting signal can be inputted.

As a feature of the driving control device according to any of claims 1–4, each CPU (51) of the integral managing controller (5A) and the ON-OFF controller (5B) is provided with indoor address setting range specifying means (52) and signal transmitting means (53) for each establishing communication between each of the indoor units (3, 3, ...) and the integral managing controller (5A) and between each of the indoor units (3, 3, ...) and the ON-OFF controller (5B), and is provided with address storing means (60). Further, the CPU (31) of the indoor unit (3, 3, . . . ) is provided with setting allowing means (32), address storing means (33), error judging means (34) and signal transmitting means (70).

The setting range specifying means (52) is composed so as to specify a range of address settings which corresponds to the number of indoor units (3, 3, . . . ) manageable by each of the integral managing controller (5A) and the ON-OFF controller (5B) and which can be set to the indoor units (3, 3 . . . ).

Specifically, for example, the integral managing controller (5B) of FIG. 4 is composed so as to be manageable with respect to 64 indoor units (3, 3, . . . ) at the maximum. Thus, the setting range specifying means (52) of the integral managing controller (5A) is composed so as to specify a range of address settings of indoor address #0 to indoor address #63.

On the other hand, each of the ON-OFF controllers (5B) is composed so as to be manageable with respect to 16 indoor units (3, 3, . . . ) at the maximum. For example, the setting range specifying means (52) of one ON-OFF controller (5B) of FIG. 4 is composed so as to specify a range of address settings of indoor address #0 to indoor address #15, and respective setting range specifying means (52) of the other three ON-OFF controllers (5B) are composed so as to specify respective ranges of address settings of indoor address #16 to indoor address #31, indoor address #32 to indoor address #47, and indoor address #48 to indoor address #63.

Since the ON-OFF controller (5B) of FIG. 5 is provided singly, the setting range specifying means (52) is composed so as to specify a range of address settings of indoor address #0 to indoor address #15.

The signal transmitting means (53) is composed so as to output a signal showing a range of address settings based on the range of address settings which has been specified by the setting range specifying means (52).

TABLE 1

| Indoor address | Field | Bit | Meaning | |
|---|---|---|---|---|
| Address 112–127 | D0 | 7 | 0 = NON | 1 = normal |
| Address 97–111 | | 6 | 0 = NON | 1 = normal |
| Address 80–95 | | 5 | 0 = NON | 1 = normal |
| Address 64–79 | | 4 | 0 = NON | 1 = normal |
| Address 48–63 | | 3 | 0 = NON | 1 = normal |
| Address 32–47 | | 2 | 0 = NON | 1 = normal |
| Address 16–31 | | 1 | 0 = NON | 1 = normal |
| Address 0–15 | | 0 | 0 = NON | 1 = normal |
| Address 240–253 | D1 | 7 | 0 = NON | 1 = normal |
| Address 224–239 | | 6 | 0 = NON | 1 = normal |
| Address 208–223 | | 5 | 0 = NON | 1 = normal |
| Address 192–207 | | 4 | 0 = NON | 1 = normal |
| Address 176–191 | | 3 | 0 = NON | 1 = normal |
| Address 160–175 | | 2 | 0 = NON | 1 = normal |
| Address 144–159 | | 1 | 0 = NON | 1 = normal |
| Address 128–143 | | 0 | 0 = NON | 1 = normal |

For the signal showing a range of address settings, for example, as shown in Table 1, field D0 and field D1 in a transmitting signal are each composed of 8 bits and each specified so as to indicate a range of address settings. Since the signal transmitting means (53) of the integral managing controller (5A) can manage 64 indoor units (3, 3, . . . ), the signal transmitting means (53) sets the bits "0" to "3" of the field D0 and transmits them every one minute. The signal transmitting means (53) of the ON-OFF controller (5B) which manages indoor address #0 to indoor address #15 sets the bit "0" of the field D0 and transmits it every one minute.

The signal transmitting means (53) of the ON-OFF controller (5B) which manages indoor address #16 to indoor address #31 sets the bit "1" of the field D0 and transmits it every one minute. The signal transmitting means (53) of the ON-OFF controller (5B) which manages indoor address #32 to indoor address #47 sets the bit "2" of the field D0 and transmits it every one minute. The signal transmitting means (53) of the ON-OFF controller (5B) which manages indoor address #48 to indoor address #63 sets the bit "3" of the field D0 and transmits it every one minute.

The address storing means (60) is composed, when indoor addresses are set to the respective indoor units (3, 3, . . . ) and address signals indicative of the indoor addresses are transmitted from the respective indoor units (3, 3, . . . ), so as to store the respective indoor addresses.

The setting allowing means (32) of the indoor unit (3, 3, . . . ) is composed, when receiving a signal showing a range of address settings which has been outputted from each of the signal transmitting means (53) of the integral managing controller (5A) and the ON-OFF controller (5B), so as to output a signal allowing an address setting to the remote control (4).

The address storing means (33) is composed so as to store an indoor address set by an input from the remote control (4).

The signal transmitting means (70) is composed so as to transmit an address signal of an indoor address stored by the address storing means (33) to the integral managing controller (5A) and the ON-OFF controller (5B). For example, the signal transmitting means (70) transmits an address signal to the integral managing controller (5A) and the ON-OFF controller (5B) at power-on of the integral managing controller (5A) and the ON-OFF controller (5B), and then the respective address storing means (60) of the integral managing controller (5A) and the ON-OFF controller (5B) store the indoor address to register it.

The error judging means (34) is composed, when receiving a signal showing a range of address settings which has been outputted from either of the signal transmitting means (53) of the integral managing controller (5A) and the ON-OFF controller (5B), so as to judge, based on the signal showing a range of address settings, whether a communication error is generated between the indoor unit (3) and the integral managing controller (5A) or the ON-OFF controller (5B).

For example, the error judging means (34) of the indoor unit (3, 3, . . . ) an indoor address of which is set to #0 is composed so as to capture a signal showing a range of address settings of indoor address #0 to indoor address #15 from the ON-OFF controller (5B), and judge as being normal when the bit "0" of the field D0 is set or judge as being a communication error when that bit is reset. That is, the signal showing a range of address settings is doubled as a signal for detecting a communication error.

As a feature of a driving control device according to claims 10–12, the indicating part (4b) of the remote control (4) forms indicating means for indicating a range of address settings by turning the address setting button (4d) on when receiving a signal allowing an address setting from the indoor unit (3, 3, . . . ). The input button (4c) forms input means from which an operator or the like inputs an indoor address of the indoor unit (3, 3, . . . ) based on the indication of the indicating part (4d). That is, only indoor addresses within the indication of the indicating part (4d) are set by the input button (4c). The remote control (4) forms address setting means.

Next, description is made about the reason that, as mentioned above, a signal showing a range of address settings of indoor addresses is transmitted to the indoor units (3, 3, . . . ) from each of the integral managing controller (5A) and the ON-OFF controller (5B).

As described above, the integral managing controller (5A) is composed so as to have the ability of controlling 64 indoor units (3, 3, . . . ). The ON-OFF controller (5B) is composed so as to have the ability of controlling 16 indoor units (3, 3, . . . ). Respective ranges of address settings of indoor addresses are specified with respect to the respective controllers (5A, 5B). Thus, when an indoor address of the indoor unit (3, 3, . . . ) is set by the remote control (4), for example, when indoor address #63 is set to one indoor unit (3, 3, . . . ) of the air conditioner (1A) of FIG. 4, since the integral managing controller (5A) and the ON-OFF controller (5B) which manage the indoor unit (3, 3, . . . ) of the indoor address #63 are present normal communication can be established.

However, when indoor address #63 is set to one indoor unit (3, 3, . . . ) of the air conditioner (1B) of FIG. 5 in the same manner as that of FIG. 4, since the ON-OFF controller (5B) which manages the indoor unit (3, 3, . . . ) of the indoor address #63 is not present, normal communication cannot be established thereby generating a communication error.

Therefore, a range of address settings of indoor addresses to be set to the indoor units (3, 3, . . . ) is indicated on the remote control (4).

Address Setting Operation in First Embodiment

Next, description is made about a setting operation of an indoor address in the air conditioners (1A, 1B).

First, in the integral managing controller (5A) and the ON-OFF controller (5B), a range of address settings is specified with respect to the setting range specifying means (52) in accordance with the number of indoor units (3, 3, . . . ) managed by the integral managing controller (5A) and the ON-OFF controller (5B).

For example, in FIG. 4, the setting range specifying means (52) of the integral managing controller (5A) specifies a range of address settings of indoor address #0 to indoor address #63. The setting range specifying means (52) of one ON-OFF controller (5B) specifies a range of address settings of indoor address #0 to indoor address #15. On the other hand, since the ON-OFF controller (5B) of FIG. 5 is provided singly, the setting range specifying means (52) thereof specifies a range of address settings of indoor address #0 to indoor address #15.

Both the signal transmitting means (53) of the integral managing controller (5A) and the ON-OFF controller (5B) each transmit a signal showing a range of address settings to each of the indoor units (3, 3, . . . ) based on Table 1.

Figure 7:
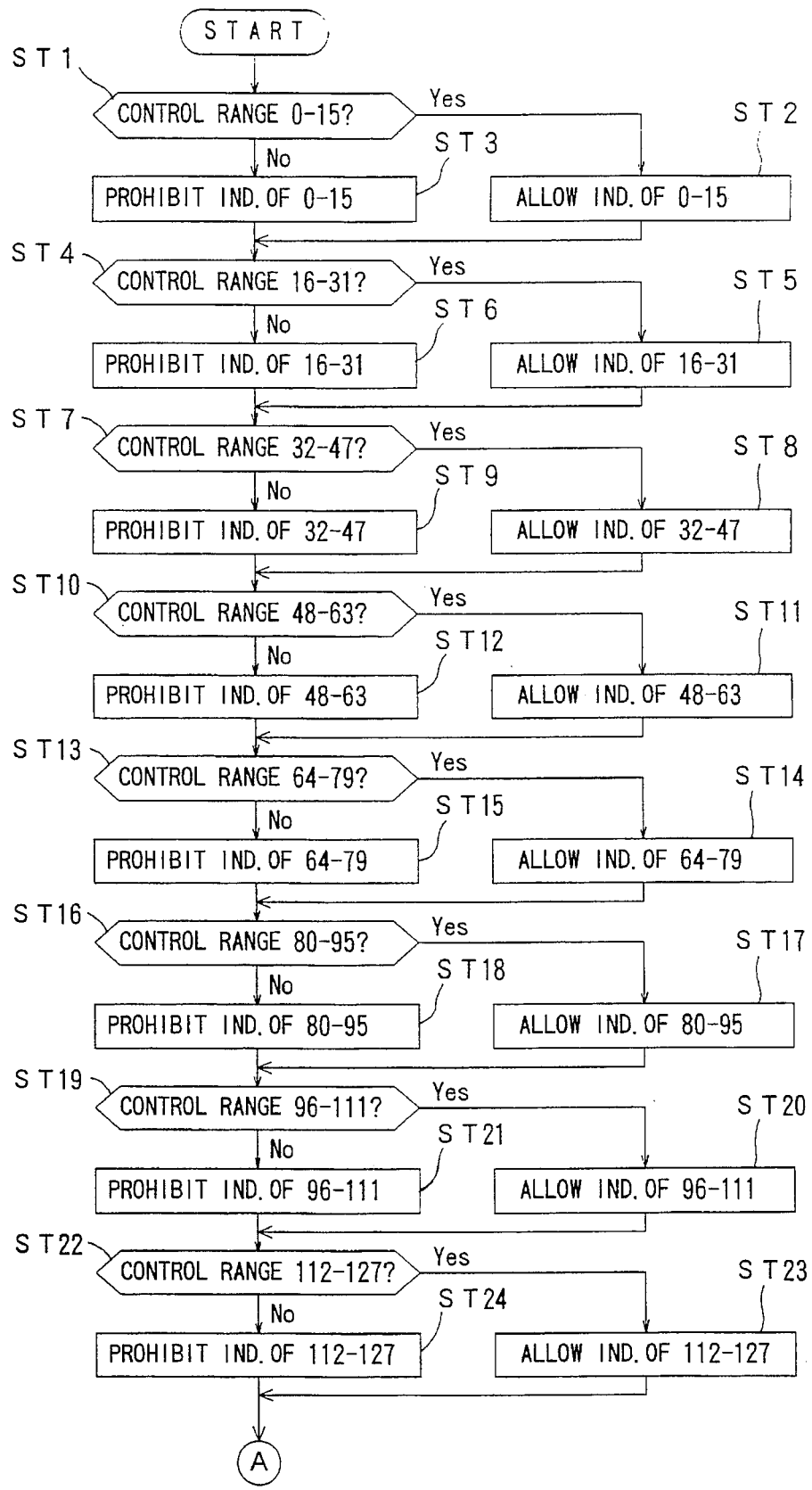
FIG. 7 is a control flow chart of an indoor unit at the setting of an indoor address.
Figure 8:
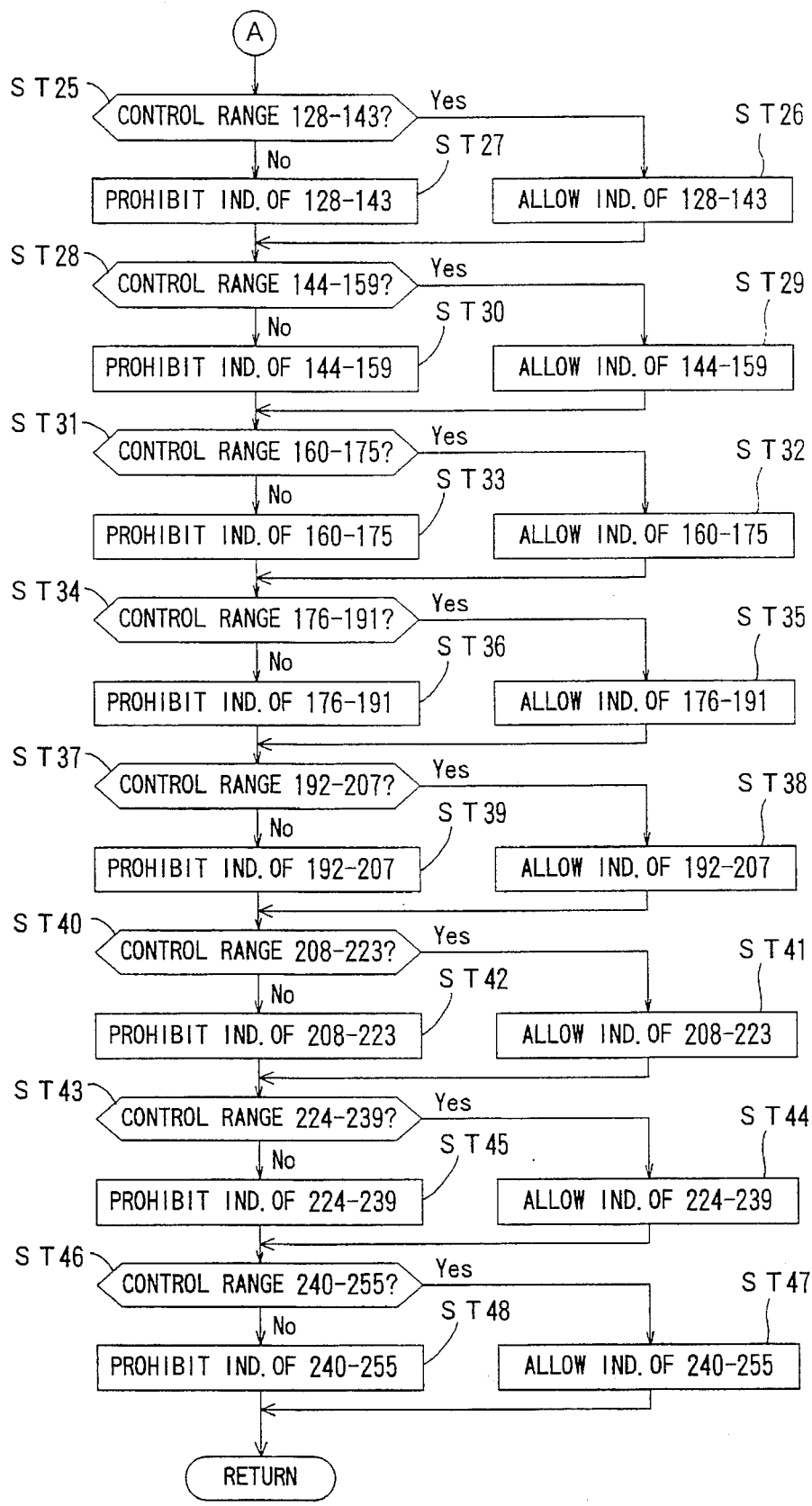
FIG. 8 is a control flow chart of an indoor unit at the setting of an indoor address.

As shown in FIG. 7 and FIG. 8, each of the indoor units (3, 3, . . . ) outputs a signal allowing an address setting when receiving the signals each showing a range of address settings from the integral managing controller (5A) and the ON-OFF controller (5B).

Specifically, after the routine starts, judged at a step ST1 is whether settings of address #0 to address #15 are possible or not. The judgment is made depending on whether the bit "0" of the field D0 in Table 1 is set or not. When the bit "0" is set, the routine proceeds from the step ST1 to a step ST2. At this step, the setting allowing means (32) outputs to the remote control (4) a signal allowing an address setting of indoor address #0 to indoor address #15. When the bit "0" of the field D0 is not set, the judgment at the step ST1 is NO so that the routine proceeds to a step ST3. At this step, the setting allowing means (32) does not output a signal allowing an address setting in order to prohibit an address setting of indoor address #0 to indoor address #15.

Next, at a step ST4 to a step ST48, a signal allowing an address setting is outputted or not to the remote control (4) based on each of the bits "0" to "7" of the fields D0 and D1 in Table 1 as in the step ST1 to the step ST3.

In other words, since each of the air conditioners (1A, 1B) is composed so as to have the ability of controlling 256 indoor units (3, 3, . . . ) at the maximum, each of the indoor units (3, 3, . . . ) judges whether or not to output a signal allowing an address within a range of address settings of indoor address #0 to #255.

When the remote control (4) receives from the indoor unit (3, 3, . . . ) a signal allowing an address setting and then the address setting button (4d) is turned on with the signal allowing an address setting received, a range of address settings is indicated on the indicating part (4b). At the sight of this indication, an operator or the like operates the input button (4c) to input an indoor address within the range of address settings.

When the indoor unit (3, 3, . . . ) receives the indoor address inputted from the remote controller (4), the address storing means (33) stores the indoor address, and the signal transmitting means (70) transmits an address signal of the set indoor address to the integral managing controller (5A) and the ON-OFF controller (5B).

Then, the address storing means (60) of each of the integral managing controller (5A) and the ON-OFF controller (5B) stores and registers the indoor address of the indoor unit (3, 3, . . . ) managed by each of the integral managing controller (5A) and the ON-OFF controller (5B). Thereafter, based on the indoor address, the integral managing controller (5A) and the ON-OFF controller (5B) each establish communication with the indoor unit (3, 3, . . . ).

Further, since each of the integral managing controller (5A) and the ON-OFF controller (5B) transmits to each of the indoor units (3, 3, . . . ) a signal showing a range of address settings which is control information shown in Table 1, for example, every one minute, the error judging means (34) of each of the indoor units (3, 3, . . . ) receives the signal showing a range of address settings to judge whether a communication error is generated between the indoor unit (3) and the integral managing controller (5A) or the ON-OFF controller (5B).

Specifically, for example, the error judging means (34) of the indoor unit (3, 3, . . . ) in which its indoor address is set to #0 captures from the ON-OFF controller (5B) a signal showing a range of address settings of indoor address #0 to indoor address #15, and judges as being normal when the bit "0" of the field D0 is set or judges as being a communication error when the bit "0" of the field D0 is reset.

Effects of First Embodiment

According to this embodiment, since data on a range of address settings is transmitted to the indoor units (3, 3, . . . ) from the integral managing controller (5A) and the ON-OFF controller (5B), this prevents improper settings of indoor address with respect to the indoor units (3, 3, . . . ). As a result, a communication error due to the improper address setting can be securely prevented, thereby enhancing communication accuracy.

Further, since a range of address settings is indicated on the remote controller (4) and an address of the indoor unit (3, 3, . . . ) is set based on the indication of the range of address settings, indoor addresses of the indoor units (3, 3, ...) managed by the integral managing controller (5A) and the ON-OFF controller (5B) can be securely set. This facilitates address settings and prevents improper settings of indoor addresses. In particular, since the integral managing controller (5A) and the ON-OFF controller (5B) automatically store the indoor addresses, this increases workability at the installation of the indoor unit (3, 3, ...) and other times.

Furthermore, since each signal showing a range of address settings which has been transmitted from the integral managing controller (5A) and the ON-OFF controller (5B) is used as a signal for detecting a communication error, the communication error can be also detected without increase of communication information. This simplifies communication information while enhancing communication accuracy.

Moreover, since the remote control (4) forms address setting means, exclusive address setting means is not necessary. This simplifies the configuration of the driving control device.

Second Embodiment

Figure 9:
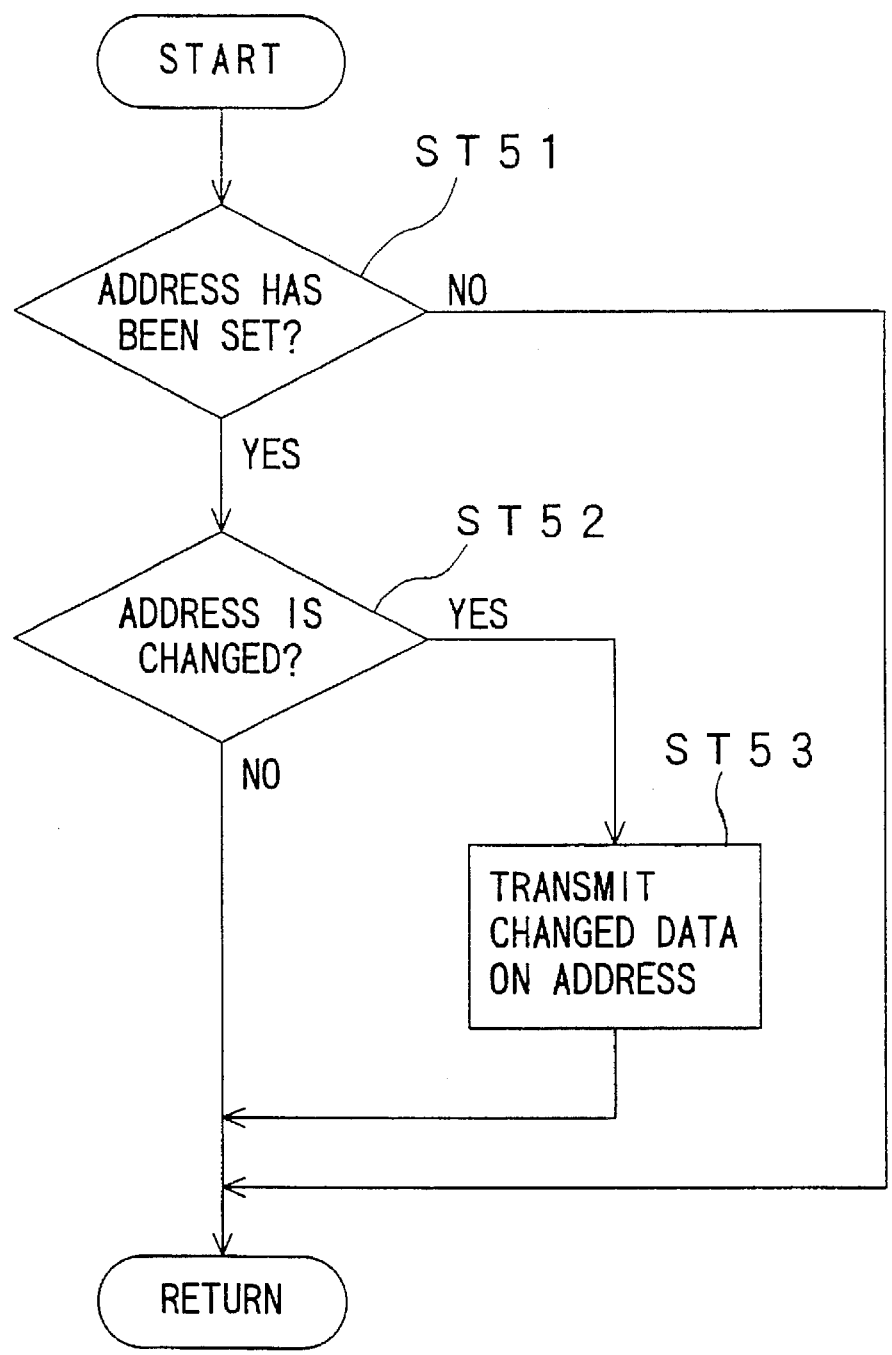
FIG. 9 is a control flow chart of an indoor unit at the changing of an indoor address.
Figure 10:
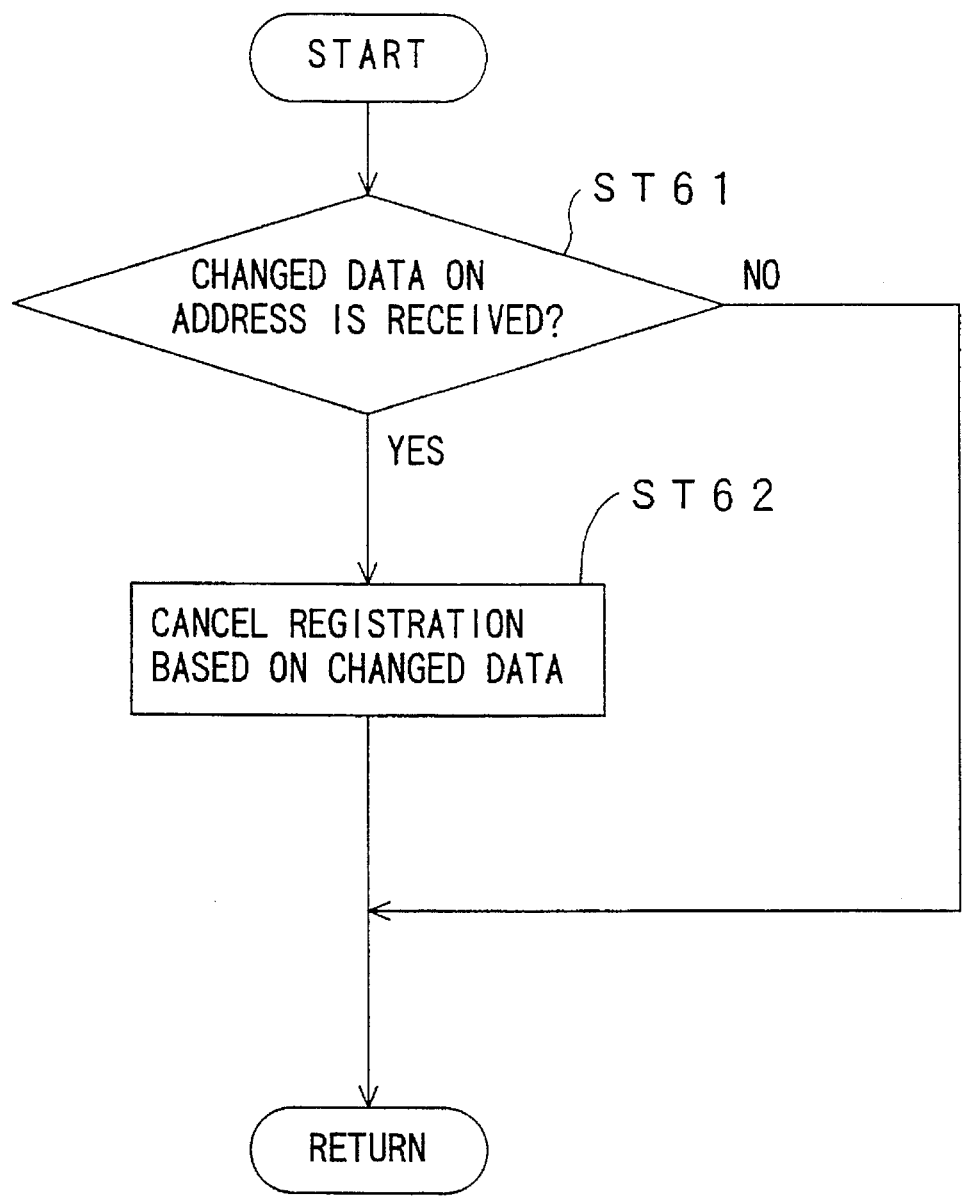
FIG. 10 is a control flow chart of an ON-OFF controller at the changing of an indoor address.

FIG. 9 and FIG. 10 each show a control flow chart showing an embodiment according to claim 5 of this invention. As shown in dot-dash lines in FIG. 6, indoor units (3, 3, ...) are each provided with data output means (35), while an integral managing controller (5A) and an ON-OFF controller (5B) which are integral controllers are each provided with address canceling means (54).

The data output means (35) is composed, as mentioned above, when an indoor address is set to an indoor unit (3) and thereafter the set indoor address is changed by a remote control (4), so as to output changed data together with the changed indoor address.

The address canceling means (54) is composed, when receiving the changed data outputted from the data output means (35) of the indoor unit (3), so as to cancel from address storing means (60) a registered address of the indoor unit (3) which has been changed and to store the changed new indoor address in the address storing means (60).

Specifically, as shown in FIG. 5, for example, when the indoor address of the indoor unit (3) which has been set once as indoor address #5 is changed to indoor address #8 by the remote control (4), the data output means (35) of the indoor unit (3) transmits to the ON-OFF controller (5B) changed data together with the indoor address #8, and then the ON-OFF controller (5B) cancels the prior indoor address #5 and stores and registers the new indoor address #8.

Address Changing Operation in Second Embodiment

Description is made below about a control operation at the change of indoor address with reference to FIG. 9 and FIG. 10.

FIG. 9 shows a control flow chart in the indoor unit (3). First, judged at a step ST51 is whether an indoor address is set or not. Until the indoor address is set, the routine returns. When an indoor address has been set, the judgment at the step ST51 is YES so that the routine proceeds to a step ST52. At this step, judged is whether the indoor address is changed or not.

When the indoor address is not changed, the routine immediately returns. On the other hand, when the indoor address is changed by the remote control (4), that is, when the address setting button (4d) is operated and a new indoor address is set by the input button (4c), the judgment at the step ST52 is YES so that the routine proceeds to a step ST53. At the step ST53, the data output means (35) outputs to the ON-OFF controller (5B) changed data showing that the indoor address has been changed, together with the changed indoor address. Then, the routine returns.

FIG. 10 shows a control flow chart in the ON-OFF controller (5B). First, judged at a step ST61 is whether the changed data is outputted from the data output means (35) of the indoor unit (3). Until the ON-OFF controller (5B) receives the changed data, the routine returns.

When the ON-OFF controller (5B) receives the changed data on the indoor address from the indoor unit (3), the judgment at the step ST61 is YES so that the routine proceeds to a step ST62. At this step, the address canceling means (54) cancels the existing indoor address according to the changed data, and stores and registers the new indoor address in the address storing means (60). Then, the routine returns.

As a result, thereafter, communication is established between the ON-OFF controller (5B) and the indoor unit (3) based on the new indoor address.

In this embodiment, as shown in FIG. 4, it is a matter of course that the integral managing controller (5A) may be provided with address canceling means (54).

Effects of Second Embodiment

According to this embodiment, when an address of the indoor unit (3, 3, ...) is changed, the ON-OFF controller (5B) changes the existing indoor address to a new indoor address and registers the new address. This securely prevents a communication error after the change of address, thereby securely enhancing communication accuracy.

In particular, since re-registration of address by a power reset of the ON-OFF controller (5B) or other manners is not necessary, this facilitates address settings thereby increasing serviceability.

Further, when an indoor address is changed, it is essential only that a new address is inputted, and an operation of deleting the pre-changed indoor address is dispensed with. This facilitates an address changing operation.

Third Embodiment

Figure 11:
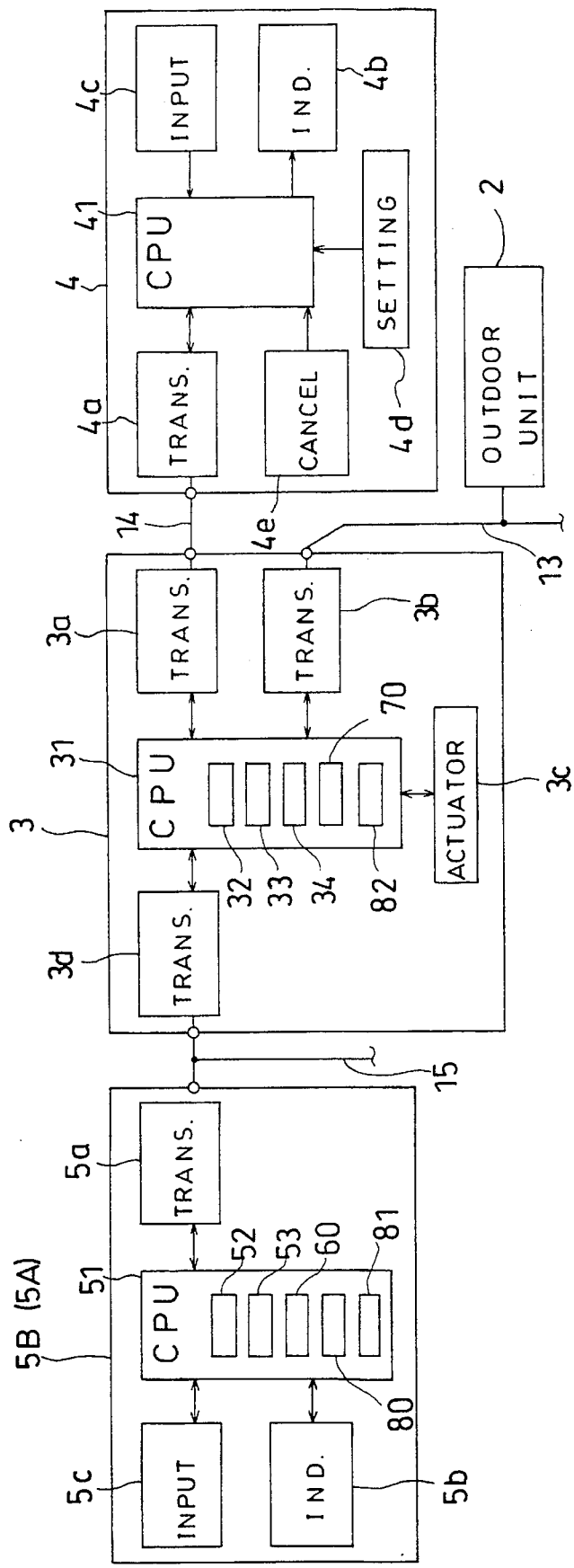
FIG. 11 is a block diagram showing a control system of a main part of another air conditioner.

FIG. 11 shows a block diagram for control in an embodiment according to claims 6–9 of this invention. In this embodiment, each of an integral managing controller (5A) and an ON-OFF controller (5B) cancels from a range of address settings an indoor address set to an indoor unit (3, 3, ...).

Specifically, a remote control (4) is provided, in addition to the structure of the first embodiment shown in FIG. 6, with address canceling button (4e) as a feature of this invention.

Further, as in the first embodiment of FIG. 6, a CPU (51) of the ON-OFF controller (5B) is provided with setting range specifying means (52), signal transmitting means (53) and address storing means (60). In addition, as a feature of this embodiment, the CPU (51) is provided with address deleting means (80) and address adding means (81).

On the other hand, as in the first embodiment of FIG. 6, a CPU (31) of the indoor unit (3, 3, ...) is provided with setting allowing means (32), address storing means (33), error judging means (34) and signal transmitting means (70). In addition, as a feature of this embodiment, the CPU (51) is provided with address changing means (82).

The address canceling button (4e) is so composed that a canceling signal is inputted thereto. After the address canceling button (4e) is turned on, an indoor address to be canceled is inputted from the input button (4c).

The address changing means (82) is composed, when an indoor address set to the indoor unit (3) is canceled by the remote control (4), so as to output canceling data showing that the indoor address has been canceled, together with the canceled address.

The address deleting means (80) is composed, when receiving an address signal outputted from the signal transmitting means (70) of each indoor unit (3, 3, . . . ), so as to delete an indoor address having been set from a range of address setting in the setting range specifying means (52).

For example, in FIG. 5, when indoor address #0 is set to one indoor unit (3), a range of address settings in the setting range specifying means (52) of the ON-OFF controller (5B) is changed into indoor addresses #1 to #15. The range of address settings is transmitted to the remote controls (4) via the indoor units (3, 3, . . . ) and is indicated on the indicating parts (4b).

The address adding means (81) is composed, when receiving remote control (4), so as to output canceling data showing that the indoor address has been canceled, together with the canceled address.

The address deleting means (80) is composed, when receiving an address signal outputted from the signal transmitting means (70) of each indoor unit (3, 3, . . . ), so as to delete an indoor address having been set from a range of address setting in the setting range specifying means (52). Further, since the changed indoor address #1 is deleted from the setting range specifying means (52) by the address deleting means (80), the range of address settings in the setting range specifying means (52) is changed into indoor address #0 and indoor addresses #2 to #15. This range of address settings is transmitted to the remote controllers (4) via the indoor units (3, 3, . . . ) and is indicated on the indicating parts (4b). the canceling data which has been outputted from the address changing means (82) of the indoor unit (3, 3, . . . ), so as to add the canceled indoor address to a range of address settings in the setting range specifying means (52).

Figure 12:
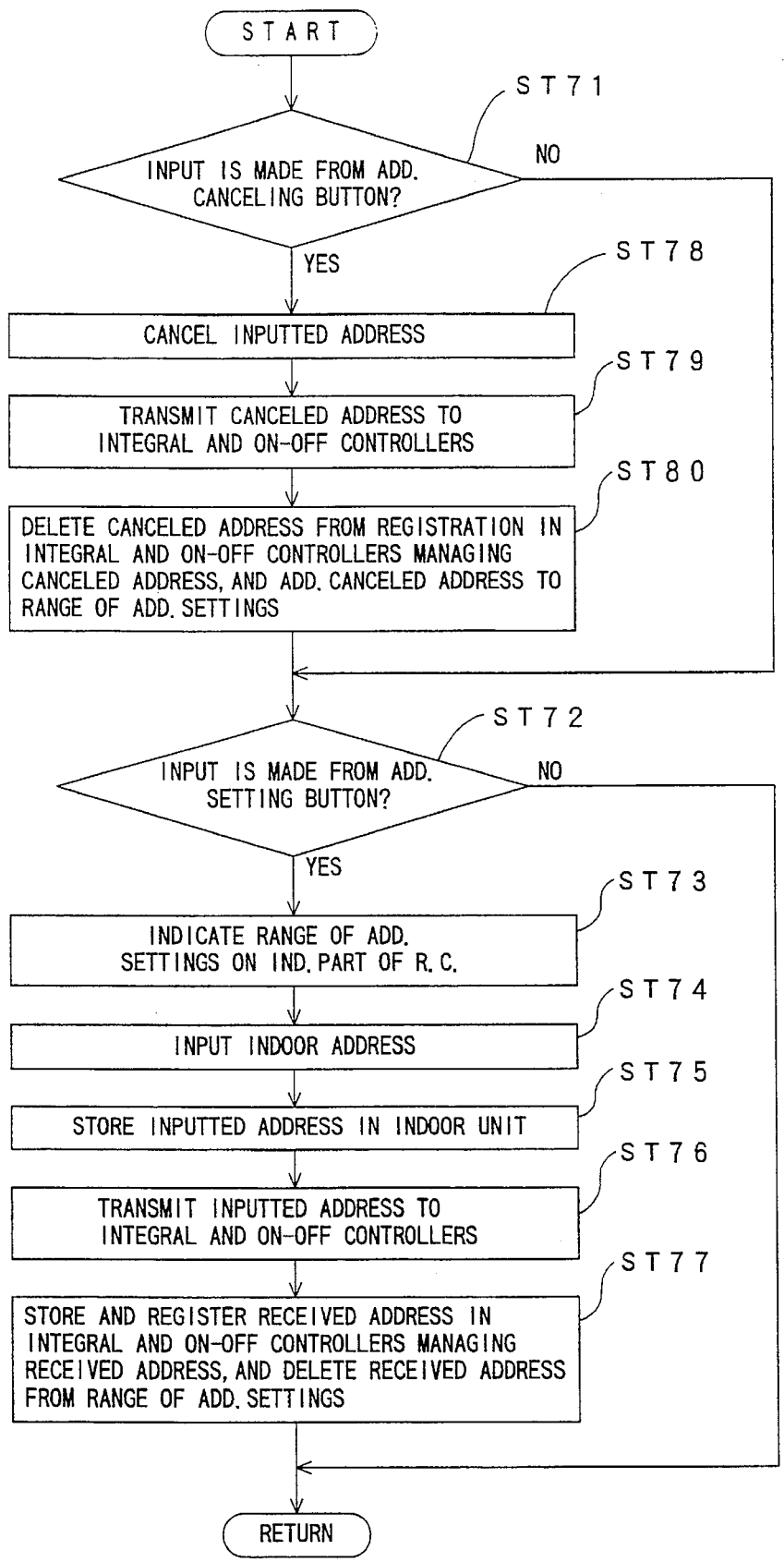
FIG. 12 is a control flow chart at the setting and changing of an indoor address.

Next, description is made about an address setting operation of an indoor address with reference to FIG. 12.

First, after an address setting operation starts, judged at a step ST71 is whether inputting is made from the address canceling button (4e) of the remote control (4).

At an initial setting of indoor address, since the address canceling button (4e) is not operated, the routine proceeds from the step ST71 to a step ST72. At this step, judged is whether the address setting button (4d) is turned on or not. When the address setting button (4d) is turned on, the routine proceeds from the step ST72 to a step ST73 so that a range of address settings is indicated on the indicating part (4b) of the remote control (4).

In other words, as in the first embodiment shown in FIG. 7 and FIG. 8, a range of address settings which has been specified by the setting range specifying means (52) of each of the integral managing controller (5A) and the ON-OFF controller (5B) is transmitted to the remote controls (4) via the indoor units (3, 3, . . . ). Then, each of the remote controls (4) indicates the range of address settings.

Thereafter, the routine proceeds from the step ST73 to a step ST74, in which an indoor address is inputted from the input button (4c) of the remote control (4). Then, the routine proceeds to a step ST75. At this step, the address storing means (33) of each of the indoor units (3, 3, . . . ) stores the set indoor address. Next, the routine proceeds to a step ST76, in which the signal transmitting means (33) of each of the indoor units (3, 3, . . . ) transmits an address signal of the set indoor address to the integral managing controller (5A) and the ON-OFF controller (5B).

When the address signal is transmitted, the routine proceeds to a step ST77. At this step, the address deleting means (80) of each of the integral managing controller (5A) and the ON-OFF controller (5B) deletes the set indoor address from the range of address settings in the setting range specifying means (52). Then, the routine returns.

For example, in FIG. 5, when indoor address #0 is set to one indoor unit (3), a range of address settings in the setting range specifying means (52) of the ON-OFF controller (5B) is changed into indoor addresses #1 to #15. This range of address settings is transmitted to the remote controls (4) via the indoor units (3, 3, . . . ) and is indicated on the indicating parts (4b).

Then, the above-mentioned operation is repeated so that respective indoor addresses are set to the respective indoor units (3, 3, . . . ). At this time, the range of address settings in the setting range specifying means (52) is gradually decreased as an indoor address is set.

On the other hand, when an indoor address which has been set once is changed, a canceling signal is first inputted from the address canceling button (4e) of the remote control (4). Accordingly, the judgment at the step ST71 for judging whether the canceling signal is inputted becomes YES so that the routine proceeds to a step ST78. At this step, in the indoor routine proceeds to a step ST78. At this step, in the indoor unit (3) an indoor address of which should be canceled, the indoor address inputted from the input button (4c) of the remote control (4) is canceled from the data storing means (33). Then, the routine proceeds to a step ST79, in which the address changing means (82) of the indoor unit (3) transmits the canceled indoor address to the integral managing controller (5A) and the ON-OFF controller (5B).

Next, the routine proceeds from the step ST79 to a step ST80. At this step, the address adding means (81), which is included in each of the integral managing controller (5A) and the ON-OFF controller (5B) each managing the indoor unit (3) having the canceled indoor address, adds the canceled indoor address to a range of address settings in the setting range specifying means (52).

For example, in FIG. 5, when indoor address #0 of one indoor unit (3) is canceled, the indoor address #0 is added to a range of address settings in the setting range specifying means (52) of the ON-OFF controller (5B).

Then, when the address setting button (4d) of the remote control (4) is turned on so that a new indoor address is set, the above-mentioned operation of the step ST72 to the step ST77 is performed so that the new indoor address is deleted from the range of address settings in the setting range specifying means (52).

For example, in FIG. 5, an indoor address of one indoor unit (3) is changed from #0 to #1, the indoor address #0 is added to a range of address settings in the setting range specifying means (52) of the ON-OFF controller (5B) while the indoor address #1 is deleted from the range of address settings. Accordingly, the range of address settings in the setting range specifying means (52) is changed into indoor address #0 and indoor addresses #2 to #15, and this range of address settings is indicated on the indicating parts (4b) of the indoor units (3, 3, . . . ).

Effects of Third Embodiment

According to this embodiment, when an indoor address of the indoor unit (3, 3, . . . ) is set, the indoor address thus set is deleted from a range of address settings in the setting range specifying means (52) of each of the integral managing controller (5A) and the ON-OFF controller (5B), thereby obviating duplicate settings of indoor address. As a result, a communication error can be securely prevented thereby enhancing communication accuracy.

Further, when the indoor address of the indoor unit (3, 3, ...) is canceled, the canceled indoor address is added to a range of address settings in the setting range specifying means (52) of each of the integral managing controller (5A) and the ON-OFF controller (5B). This enables accurate recognition of indoor addresses which can be set, thereby facilitating indoor address settings.

Other Modifications

In the above embodiments, address setting means is a remote control (4). However, in this invention, the address setting means is not limited to the remote control (4) and exclusive address setting means for address setting may be provided.

Further, in the above embodiments, the integral managing communication error can be securely prevented thereby enhancing communication accuracy.

Further, when the indoor address of the indoor unit (3, 3, ...) is canceled, the canceled indoor address is added to a (4e) is provided for canceling an indoor address. However, an indoor address may be canceled at the step ST71 and the step ST78 shown in FIG. 12 when the address setting button (4d) is turned on with the indoor address set. At this time, when the address setting button (4d) is turned on at the step ST72 in FIG. 12 with no indoor address set, an indoor address can be set as mentioned above.

Industrial Field of Utilization

As described above, since a driving control device of an air conditioner of this invention can control a plurality of indoor units with the use of an integral controller, it is suitable for address setting in the case that a plurality of indoor units are provided in a large-scale building or the like.

We claim:

1. A driving control device for an air conditioner in which an integral controller (5B) is connected to a plurality of air conditioning units (3, 3, ...) so that control signals are transmitted and received between each of the air conditioning units (3, 3, ...) and the integral controller (5B), said driving control device comprising:

setting range specifying means (52) provided in the integral controller (5B) for specifying a range of address settings within which an address can be set to each of the air conditioning units (3, 3, ...) managed by the integral controller (5B);

signal transmitting means (53) provided in the integral controller (5B) for outputting a signal showing the range of address settings to each of the air conditioning units (3, 3, ...) based on the range of address settings which has been specified by the setting range specifying means (52); and setting allowing means (32) provided in each of the air conditioning units (3, 3, ...) for outputting a signal allowing an address setting when receiving the signal showing the range of address settings which has been outputted from the signal transmitting means (53) of the integral controller (5B).

2. A driving control device for an air conditioner according to claim 1, further comprising address setting means (4) having: indicating means (4b) for indicating the range of address settings when receiving the signal allowing an address setting which has been outputted from the setting allowing means (32) of the air conditioning unit (3, 3, ...); and input means (4c) from which an address of the air conditioning unit (3, 3, ...) is inputted based on the indication of the indicating means (4b), wherein each of the air conditioning units (3, 3, ...) is provided with address storing means (38) for storing a set address inputted from the input means (4c) of the address setting means (4).

3. A driving control unit for an air conditioner according to claim 2, wherein each of the air conditioning units (3, 3, ...) is provided with signal transmitting means (70) for outputting an address signal of the set address inputted from the input means (4c) of the address setting means (4), and the integral controller (5B) is provided with address storing means (60) for storing each address in each of the air conditioning units (3, 3, ...) when receiving the address signal outputted from the signal transmitting means (70) of each of the air conditioning units (3, 3, ...).

4. A driving control device for an air conditioner according to claim 1, wherein each of the air conditioning units (3, 3, ...) is provided with error judging means (34) for judging whether a communication error is generated between the air conditioning unit (3) and the integral controller (5B) or not based on the signal showing the range of address settings when receiving the signal outputted from the signal transmitting means (53) of the integral controller (5B).

5. A driving control device for an air conditioner in which an integral controller (5B) is connected to a plurality of air conditioning units (3, 3, ...) and each of the air conditioning units (3, 3, ...) is connected to address setting means (4) for setting an address of the air conditioning unit (3) so that control signals are transmitted and received between each of the air conditioning units (3, 3, ...) and the integral controller (5B) based on the address set by the address setting means (4), said driving control device comprising:

data output means (35) provided in each of the air conditioning units (3, 3, ...) for, when the set address is changed by the address setting means (4), outputting changed data together with the changed address; and address canceling means (54) provided in the integral controller (5B) for, when receiving the changed data outputted from the data output means (35) of the air conditioning unit (3, 3, ...), canceling an address registered therein with respect to the air conditioning unit (3, 3, ...) having the changed address and storing the changed address.

6. A driving control device for an air conditioner in which an integral controller (5B) is connected to a plurality of air conditioning units (3, 3, ...) so that control signals are transmitted and received between each of the air conditioning units (3, 3, ...) and the integral controller (5B), said driving control device comprising:

setting range specifying means (52) provided in the integral controller (5B) for specifying a range of address settings within which an address can be set to each of the air conditioning units (3, 3, ...) managed by the integral controller (5B);

signal transmitting means (53) provided in the integral controller (5B) for outputting a signal showing the range of address settings to each of the air conditioning units (3, 3, ...) based on the range of address settings which has been specified by the setting range specifying means (52);

setting allowing means (32) provided in each of the air conditioning units (3, 3, . . . ) for outputting a signal allowing an address setting when receiving the signal showing the range of address settings which has been outputted from the signal transmitting means (53) of the integral controller (5B);

address setting means (4) having indicating means (4b) for indicating the range of address settings when receiving the signal allowing an address setting which has been outputted from the setting allowing means (32) of the air conditioning unit (3, 3, . . . ), and input means (4c) from which an address of the air conditioning unit (3, 3, . . . ) is inputted based on the indication of the indicating means (4b);

signal transmitting means (70) provided in each of the air conditioning units (3, 3, . . . ) for outputting an address signal of the set address inputted from the input means (4c) of the address setting means (4); and address deleting means (80) provided in the integral controller (5B) for deleting the set address from the range of address settings in the setting range specifying means (52) when receiving the address signal outputted from the signal transmitting means (70) of each of the air conditioning units (3, 3, . . . ).

7. A driving control device for an air conditioner according to claim 6, wherein each of the air conditioning units (3, 3, . . . ) is provided with address storing means (33) for storing the set address address of the air conditioning unit (3, 3, . . . ) is inputted based on the indication of the indicating means (4b);

signal transmitting means (70) provided in each of the air conditioning units (3, 3, . . . ) for outputting an address conditioning units (3, 3, . . . ) when receiving the address signal outputted from the signal transmitting means (70) of each of the air conditioning units (3, 3, . . . ).

8. A driving control device for an air conditioner according to claim 6, further comprising:

address changing means (82) provided in each of the air conditioning units (3, 3, . . . ) for, when the set address is canceled by the address setting means (4), outputting canceling data together with the canceled address; and address adding means (81) provided in the integral controller (5B) for adding the canceled address to the range of address settings when receiving the canceling data outputted from the address changing means (82) of the air conditioning unit (3, 3, . . . ).

9. A driving control device for an air conditioner according to claim 8, wherein the address setting means (4) is provided with an address canceling button (4e) with which a canceling signal for canceling an address is inputted.

10. A driving control device for an air conditioner according to any of claims 2–9, wherein the address setting means (4) is composed of a remote control.

11. A driving control device for an air conditioner according to any of claims 2–4 or 6–9, wherein the input means (4c) of the address setting means (4) is composed of an input button provided in a remote control.

12. A driving control device for an air conditioner according to any of claims 2–4 or 6–9, wherein the indicating means (4b) of the address setting means (4) is composed so as to indicate the range of address settings by turning on an address setting button (4d) provided in the address setting means (4).

* * * * *